United States Patent [19]

Foertsch

[11] Patent Number: 5,202,945

[45] Date of Patent: Apr. 13, 1993

[54] OPTICAL CABLE AND METHOD FOR THE MANUFACTURE THEREOF

[75] Inventor: Johann Foertsch, Kronach, Fed. Rep. of Germany

[73] Assignee: Siemens Aktiengesellschaft, Munich, Fed. Rep. of Germany

[21] Appl. No.: 808,742

[22] Filed: Dec. 17, 1991

[30] Foreign Application Priority Data

Feb. 6, 1991 [DE] Fed. Rep. of Germany ....... 4103587

[51] Int. Cl.$^5$ .............................................. G02B 6/44
[52] U.S. Cl. .................................................... 385/105
[58] Field of Search ................................. 385/105, 110

[56] References Cited

U.S. PATENT DOCUMENTS 4,235,511 11/1980 Yonechi ........................... 350/96.23
4,361,381 11/1982 Williams ........................... 350/96.23
4,695,128 9/1987 Zimmerman ..................... 350/96.23
4,983,013 1/1991 Dotzer et al. ..................... 350/96.23

FOREIGN PATENT DOCUMENTS 0253457 1/1988 European Pat. Off. .
2832441 2/1979 Fed. Rep. of Germany .
3000674 7/1980 Fed. Rep. of Germany .
3926593A1 2/1991 Fed. Rep. of Germany .

Primary Examiner—Akm E. Ullah
Attorney, Agent, or Firm—Hill, Steadman & Simpson

[57] ABSTRACT

An optical cable comprises a plurality of bands, each containing a plurality of light waveguides, and the bands are stranded on a cable core with a long side of the bands extending in a radial direction. The light waveguides are introduced in each of the pre-fabricated bands so that the light waveguide lying on the outside as viewed in the radial direction, will have a longer length than the inwardly disposed light waveguides.

28 Claims, 6 Drawing Sheets

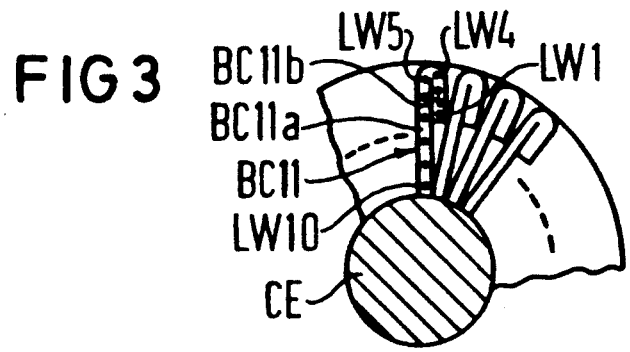
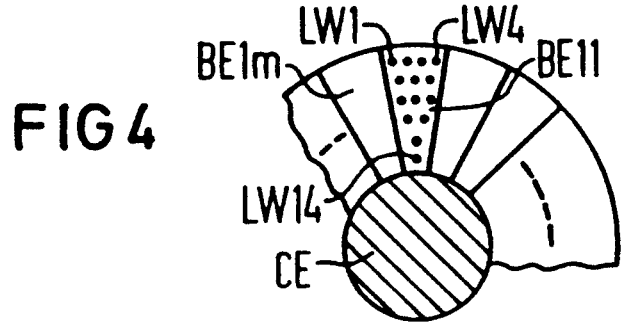
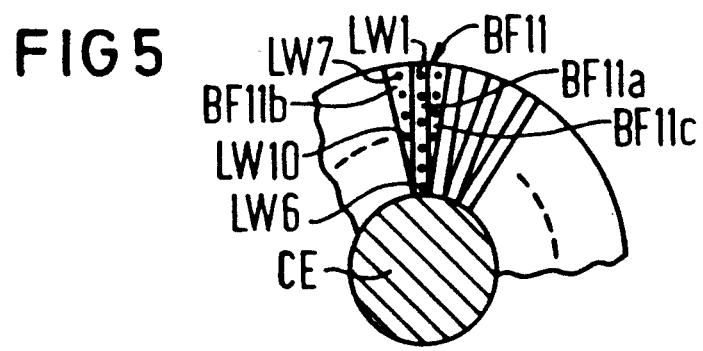
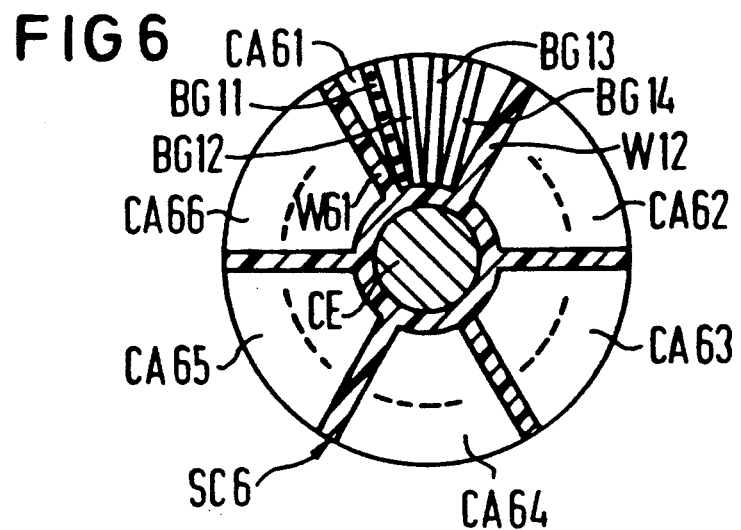

OPTICAL CABLE AND METHOD FOR THE MANUFACTURE THEREOF

BACKGROUND OF THE INVENTION

The present invention is directed to an optical cable comprising a plurality of small bands or ribbons, each respectively containing a plurality of light waveguides.

U.S. Pat. No. 4,983,013 and European Application A1 0 356 786 disclose an optical cable in which a core element is provided with approximately rectangular chambers. Such as structure, which is often referred to as a "chambered cable" is frequently utilized together with ribbon conductors, for example a plurality of light waveguides which are combined to form a band having an approximately rectangular cross section. The waveguides of the band are held together by a shared envelope of material. A plurality of the bands are united to form a band stack, and this stack is adapted to the respectively approximately rectangularly fashioned chambers on the basis of its outside contour so that it, likewise, has a rectangular shape. A small gap between the chamber wall and the band stack enables a certain mobility therebetween.

Given rectangular chambers, the wall thickness of the partitions between the individual chambers becomes broader or larger as the radial distance from the axis of the cable increases so that the walls have an approximately wedge-shaped cross section. According to the above U.S. Pat. No. 4,983,013, the space existing between chambers, in fact, is utilized to a certain extent such that outwardly opening additional depressions or grooves are formed to receive other elements. Nevertheless, a relatively great amount of space is lost because of this wall structure so that the packing density of the light waveguides cannot be made especially high.

SUMMARY OF THE INVENTION

The present invention is directed to the object of creating an optical cable that can be manufactured with high packing densities, for example a cable which will allow an increased number of light waveguides to be accommodated within a given cross section.

To accomplish these goals, the present invention is directed to an optical cable having a central core element and having a plurality of bands containing light waveguides, which are stranded on the core element with a long direction or dimension of the band extending essentially in a radial direction and that the light waveguides are introduced in these pre-fabricated bands with the light waveguide lying at the outermost position in the radial direction having a longer length that the inwardly disposed light waveguides.

Whereas the individual bands in the known arrangements are arranged with their long side or dimension extending essentially in a circumferential direction or tangentially, the invention provides that the bands extend essentially in a radial direction. This has the advantage that the stranding with a long lay or reverse lay produces no noteworthy fiber elongations. Moreover, a guide or supporting elements are no longer absolutely necessary or required to a lesser degree.

Since the radial arrangement of the bands would result in a pronounced compression of the light waveguide or light waveguides respectively lying along the inside edge of the band and a pronounced elongation of the waveguide or light waveguides respectively lying on the outside, the band structure in the present invention is no longer fashioned to be a straight-line from the beginning, but is fashioned so that the light waveguides of the bands lying at the inside edge of the band in the finished cable have a shorter length than the waveguides lying on the outside edge of the band, which edge has the longer length. How much longer the light waveguides must, respectively, be inside the band is graduated from the inside edge to the outside edge so that the introduction of the bands into the cable core that is optimally largely free of longitudinal tension as possible can be calculated in advance for a given position of the band with respect to the cable core.

A further advantage of the structure of the invention is that during the bending process, the respective bands lying in the neutral plane are not stressed, since the bending plane, likewise, proceeds radially therethrough. By contrast therewith, the bands lying on the outside when bending are initially subjected to a stressing approximately in the region perpendicular to the bending pland during the bending process. This, however, is not critical insofar as a largely tension-free introduction of the bands is already guaranteed by the prescribed excess length. Over and above this, there is the possibility that, given an especially pronounced bending process, the individual bands will dislocate lamella-like somewhat from their radial position into a less exact radial position and, as a result, proceed on a "shorter" path and provide less stretching or compressing. A small gap in the region of the outer path is expedient for this purpose.

It is also possible that the light waveguide bands are not exactly radially arranged in the unbent cable, i.e. proceeding on a straight line, but are accommodated within an angular range from approximately ±20° given bands that are SZ-stranded on the core element or, respectively, ±70° given bands which are stranded with a long lay vis-a-vis the radial direction. This has the advantage that the bands in the outside path can move further from the exact radial direction in an especially easy manner during the bending process and, thus, absorb lower stresses.

The invention is also directed to a method for manufacturing a band for an optical cable of the present invention. This method is characterized in that the plurality of individual light waveguides are supplied to a coating mechanism which serves the purpose of applying an envelope which guarantees the adhession of the individual light waveguides. The application of the coating or, respectively, envelope, is undertaken so that a greater length of the light waveguide is supplied within a given time for the light waveguides that later lie radially on the outside than is supplied for the light waveguides that later radially lie further toward the inside of the cable.

The invention is also directed to a band containing a plurality of light waveguides, wherein the light waveguides proceed tension-free in an arc with a uniform curvature in the common envelope.

In the method of the optical cable of the invention, one proceeds so that the bands are brought into the arrangement that essentially proceeds radially with reference to the cable axis and are brought into such a view in a circumferential direction that an optimally tight packing will be achieved.

Other advantages and features of the invention will be readily apparent from the following description of the preferred embodiments, the drawings and claims.

BRIEF DESCRIPTION OF THE DRAWINGS

FIG. 3 is a partial cross sectional view of a modification of the band arrangement of FIG. 2; FIG. 4 is a partial cross sectional view of a band structure utilizing wedge-shaped bands;

FIG 5. is a partial cross sectional view of a band structure utilizing wedgeshaped bands alternately with rectangular bands;

FIG. 6 is a cross sectional view of an optical cable having a chambered portion receiving the bands in accordance with the present invention;

DESCRIPTION OF THE PREFERRED EMBODIMENTS

Figure 1:
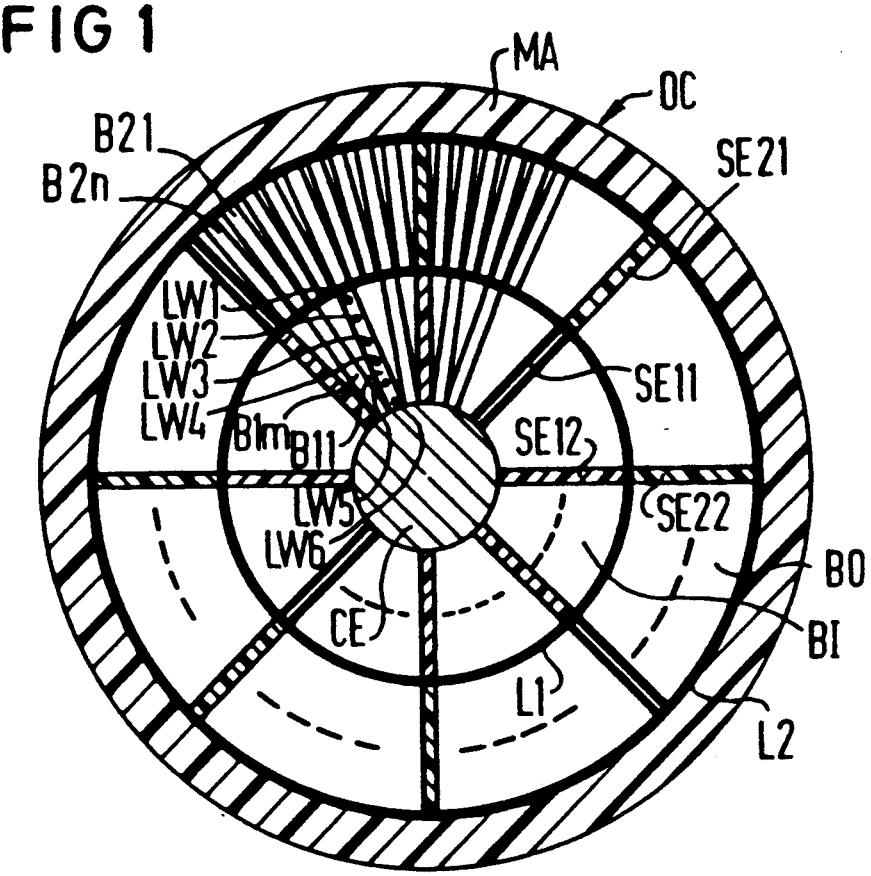
FIG. 1 is a cross sectional view of a first exemplary embodiment of the optical cable in accordance with the present invention.

The principles of the present invention are particularly useful when incorporated in an optical cable OC, generally indicated in FIG. 1.

The optical cable OC of FIG. 1 has a tensile, potentially coated core element CE, which may be either a steel core or high tensile strength plastic core. A plurality of bands $B11-B1m$ are stranded on their edges around this central core element CE in a radial arrangement. What is meant by "proceeding in a radial direction" is that the long side of each of the bands extends essentially in the radial direction. However, it is possible that a band will deviate by $\pm 20°$ if the band has been stranded on the core element with an SZ-type stranding. Also, if it is stranded on the core element with a long lay stranding, it may deviate from the exact radial direction by $\pm 70°$. A prescribed plurality of light waveguides is arranged inside a band, wherein it is assumed in the present example that one band, respectively, contains six light waveguides, which are referenced $LW1-LW6$ for the band B11. The cohesion of the band occurs with a common envelope of plastic. The bands are arranged so that the end face of their narrow side or edge directly engages the central core element CE, which may be provided with a plastic coating (not shown) and the radially inward edges are engaging the edges of adjacent bands so that an extremely tight packing of the light waveguide band is achieved.

It is expedient that the radial expanse of the light waveguides bands be not too great; in other words, between 4 and 12 light waveguides are advantageously accommodated in such a band. The approximately spoke-shaped or ray-shaped structure of the light waveguide bands occurring overall can be terminated at the outside by a coating or winding, such as a protective tube L1, wherein a cable cladding is directly applied onto the coating or winding when only one such layer BI of bands is to be applied.

When a cable, which has an extremely great number of fibers, is required, at least one additional layer BO of bands $B21-B2n$, which also extend radially, can be provided. The bands $B21-B2n$ in this additional layer BO will have the same dimensions in the present example as the bands $B11-B1m$ of the inner layer BI. A single-layer or multi-layer outside cladding MA can be applied after an additional intermediate wrapping or winding layer L2 or a further layer (not shown) of light waveguides bands has been applied in a radial arrangement.

Given, for example, inadequately compression-proof outside cladding MA, supporting elements that, likewise, expediently proceed radially can be provided in order to prevent the light waveguides from being subjected to radial compression. A greater plurality of bands, potentially in the form of band stacks, respectively, lie between these supporting elements. The supporting elements, themselves, can be fashioned as loose elements, such as $SE11-SE12$ in the present example and can, for example, be manufactured of a plastic material. The supporting elements will form a type of supporting structure for the wrapping or winding L1 or the cladding MA.

Figure 7:
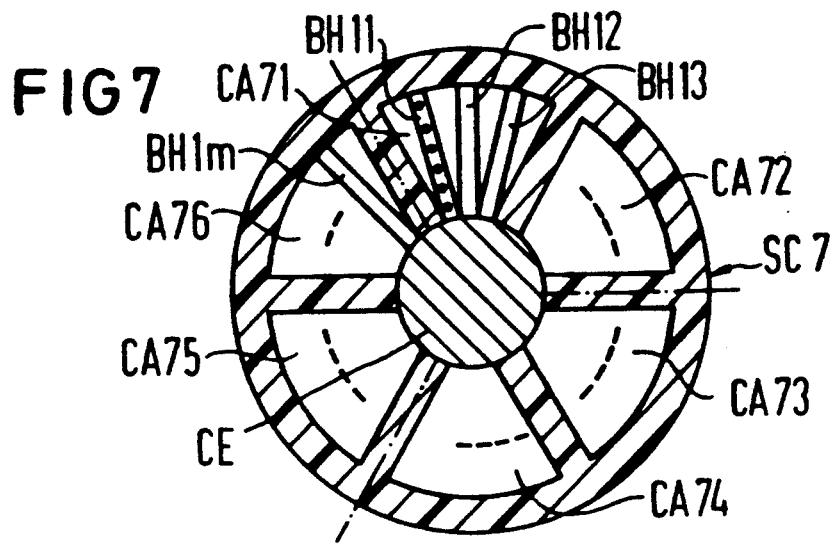
FIG. 7 is a cross sectional view of another example of an optical cable having chambers containing the bands in accordance with the present invention.

When a second layer BO of radially arranged bands $B21-B2n$ are applied, then radial supporting elements $SE21$ and $SE22$ can also be provided in this second layer. The respective support elements $SE11$ and $SE12$ of the inner layer BI and the supporting elements $SE21$ and $SE22$ of the outer layer BO are expediently arranged to be aligned in a radial direction with each other so that a through carrying sturcture is obtained. Instead of individual supporting elements, other arrangements, such as illustrated in FIGS. 6 and 7, which will be discussed hereinafter, can be utilized.

Figure 2:
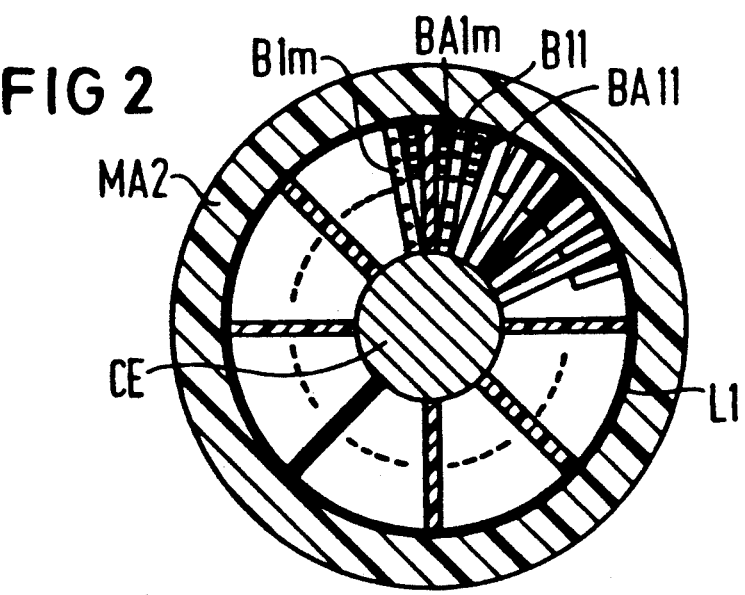
FIG. 2 is a cross sectional view of a modification of the arrangement of the optical cable of FIG. 1, which will have a higher packing density.

The arrangement of FIG. 2 shows an optical cable, wherein the packing density is increased by comparison the the packing density in the cable OC of FIG. 1. Whereas the basic structure corresponds to FIG. 1, for example, wherein you have radially proceeding bands $B11-B1m$ present, gaps are formed between successive bands, such as $B11-B1m$ and these gaps broaden outward as the radial distance from the core element CE increases. In the embodiment of FIG. 2, these gaps are partially filled out by additional smaller bands $BA1-1-BA1m$. These bands $BA11-BA1m$, of course, contain a smaller number of light waveguides than the bands $B11-B1m$. By contrast to the arrangement of FIG. 1, the cladding MA2, here, is directly applied on the single ply or layer sequence of bands $B11-B1m$ and $BA1-1-BA1m$. As illustrated, a wrapping L1 was applied before the cladding MA2.

Another possibility for achieving a tighter packing and, thus, a better utilization of the cross section of the cable is illustrated in FIG. 3. In the modification of FIG. 3, a band BC11 is radially seated on the center element or core element CE and comprises a first part BC11a, which extends over the full width of the ply of the bands. Each of the bands BC11 is also bent over in an inward direction in the outer region and this bent over portion BC11b provides an additional filling of the wedge-shaped gaps between adjacent bands. A higher packing density, such as obtained in the embodiment of FIG. 2, is, thus, obtained. The light waveguides LW1-LW4 lie in the region of the bent over part BC11b, whereas the light waveguides LW5-LW10 are in the sub-region BC11a extending over the full width of the band BC11.

Another modification is schematically illustrated in FIG. 4 and provides a packing density of the light waveguides, which is increased when the bands are employed whose cross section is constructed to have a wedge shape or, respectively, a segment shape from the outset. The entire cable core is, thus, filled out with these wedge-shaped bands BE11-BE1m to form a closed layer. The light waveguides are also shown for the band BE11, wherein four light waveguides LW1-LW4 lie along the circumferential line in the outermost layer and two layers, each having three waveguides, are provided followed by one layer having two waveguides and two additional layers, each having only a single waveguide. The innermost light waveguide is referenced LW14 so that 14 light waveguides are provided in each segment-shaped section BE11. This number is higher than, for example, the number in the comparable arrangement in FIG. 3 or in FIG. 2.

Another possibility for obtaining an optimally compact structure and, thus, for guaranteeing a high packing density, is shown in FIG. 5. A first band BF11a is provided here that comprises an approximately rectangular cross section and corresponds to the bands of FIGS. 1 and 2 and contains six light waveguides LW1-LW6. Bands fashioned approximately wedge-shaped are provided for the gap regions that will occur between adjacent rectangular bands and these bands are BF11b and BF11c. Each of these wedge-shaped bands BF11b and BF11c contain four waveguides LW7-LW10 and have approximately the same structure. The advantage of such an arrangement is that, given such narrow structures, the light waveguides need not be present as tightly packed multi-layer as in the structure of FIG. 4. All band types BF11a, BF11b expediently contain a series of light waveguides LW1-LW6 or, respectively, LW7-LW10, which are indicated by dots in the Figure. It is then also necessary to keep two different basic structures on hand, namely the rectangular band, such as BF11a, and the wedge-shaped bands, such as BF11b or BF11c. However, the overall structure obtained with these bands is extremely compact and has a high packing density, a good mobility of the individual elements, such as BF11a, BF11b and BF11c, vis-a-vis one another. Thus, the sliding process between adjacent bands is always possible in the present example, just as in the preceding example.

In the modification illustrated in FIG. 6, the central core CE is surrounded by a core element or layer SC6, which is preferably manufactured by extruding. This element SC6 is provided with a structure of a standard "chambered cable" and has six outwardly opening chambers CA61-CA66. The outwardly opening chambers CA61-CA66 are formed by partitions, such as W12, W61, and the chambers are filled by bands extending in the radial direction, wherein the bands BG11-BG14 are shown in the present example in the chamber CA61. Such a cable structure has the support properties of the traditional chambered cable and the partitions, for example W12-W61, that form the chambers CA61-CA66, approximately correspond to the support elements, such as SE11-SE12 of FIG. 2.

Another arrangement is illustrated in FIG. 7, which is similar to FIG. 6, wherein the chambers of the core element or layer SC7, preferably manufactured by extrusion, are merely inwardly opening. The chambers, such as CA71-CA76, which open radially inward, will receive radially extending bands, such as BH11, BH12 and BH13, in the chamber CA71. It is also possible to accommodate individual chambers or groups of chambers in a respective, separate element. For example, instead of providing a single layer or element which is wrapped around the cable core CE, the layer can be separately produced by individual modules with an appropriate segment-shaped cross section. In this case, seams would have to be provided along the dot-dashed lines and the overall arrangement would be composed of a series of three sub-segments or elements, each containing two chambers.

Figure 8:
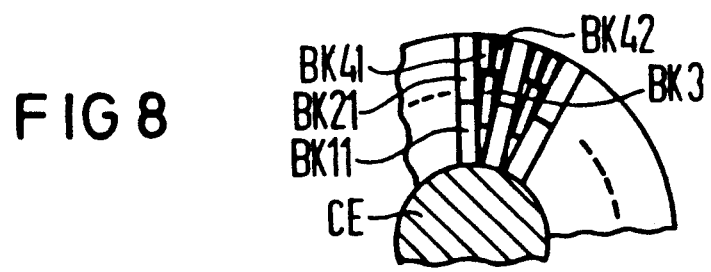
FIG. 8 is a partial cross sectional view of a modification of the band structure in accordance with the present invention.

In order to obtain a high packing density, it is also possible for individual bands to be stacked or layered inside of one another, as illustrated in FIG. 8. In addition to the broader radially arranged bands BK11 and BK21, wedge-shaped gaps are continuously filled by narrower bands BK3 that increase in number toward the outside, as well as the juxtaposed bands BK41 and BK42.

Figure 9:
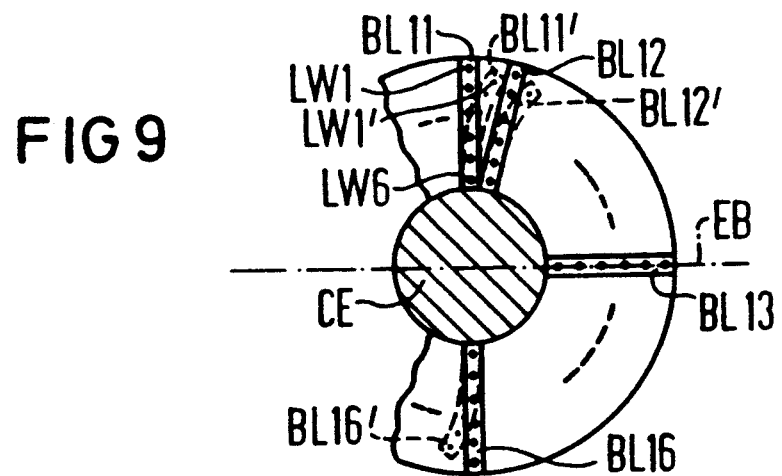
FIG. 9 is a partial cross sectional view illustrating the compensation processes of the bands during a bending process.

The cable is bent around a bending plane, such as EB, which proceeds through the axis of the tensile element CE, as illustrated in FIG. 9. The various band structures will respond in different manners. The band BL13 lies exactly on the bending plane EB and, thus, is not additionally mechanically stressed. By contrast thereto, the band BL11, which proceeds essentially perpendicular to the bending plane EB, just like the diametrically opposite band BL16, will have its outermost light waveguide, such as LW1 subjected to a mechanical stress during the bending process, which will either be in tension or compression, depending on the direction of bending. This mechanical stress can be reduced in that the band deflects in a direction transversely, vis-a-vis the radial direction, and assumes approximately a dot-dashed position, such as BL11' or BL16'. In this position, the outermost light waveguide, such as LW1', lies on a path which is of a less distance from the bending plane EB and, thus, the stress will be less during bending. The large residual gaps, which remain between the individual, radially extending bands, for example BL11, BL12, can be expediently utilized for this "excursion event". The next band BL12 that follows migrates in a somewhat less deflected position BL12', whereby the excursion at the diametrically opposite band BL16 into the position BL16' corresponds to that of the band BL11.

Normally, all the stranding elements that can freely move in the longitudinal direction have the effect of a length compensation during bending, since every element comes to lie on the outside elongated region, on the one occasion, and at the inside compression region in another occasion. The excursion motions that have been set forth will, therefore, preferably occur when a low adhesion between the bands occurs. Since the surrounding edges of the bands cannot be displaced, the fibers above the bending axis EB would have to be stretched, and those under the bending axis EB would have to be compressed. These forces, however, are of such a size that the generally low adhesion forces between the bands are overcome and a length compensation by displacement of the band in the direction of the longitudinal cable axis will occur.

Figure 10:
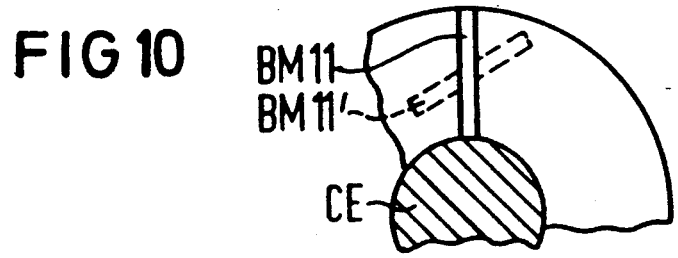
FIG. 10 is a partial cross sectional view showing another possible compensation process for the bands during a bending process.

If there is not excessively tight packing between the bands, then a structure will occur, such as illustrated in FIG. 10. During the bending process, the band BM11 can have its outer region proceed not only toward the inside, but can also proceed from the inside region toward the outside, as the schematically illustrated structure BM11' shown in broken lines will indicate.

Figure 11:
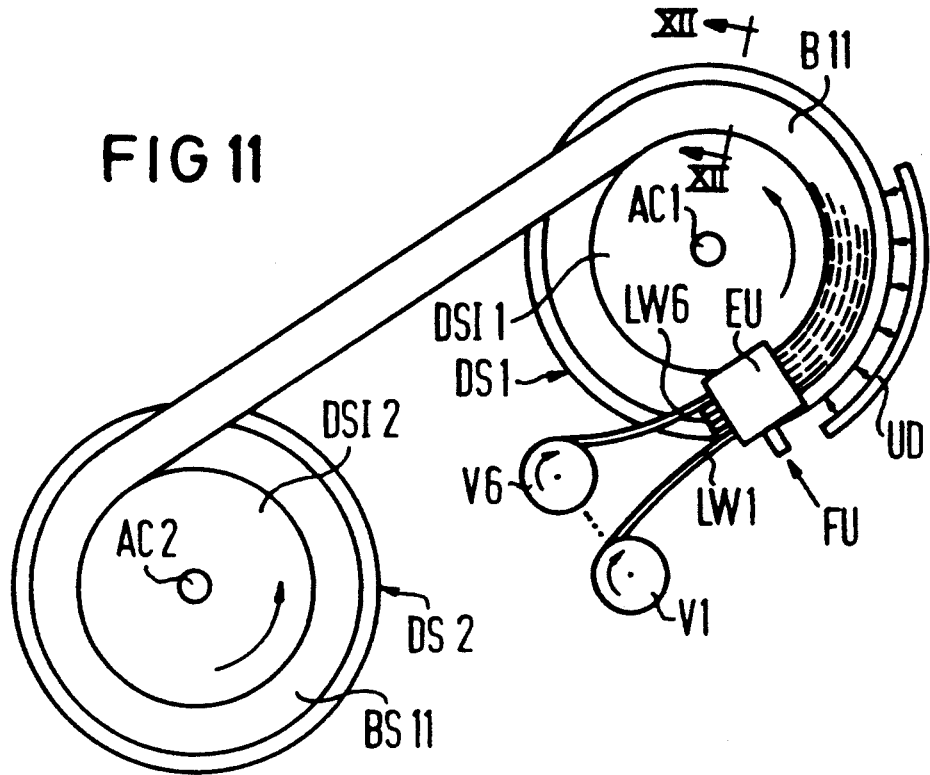
FIG. 11 is a side elevational view of an apparatus for manufacturing the bands employed in the cable of the present invention.
Figure 12:
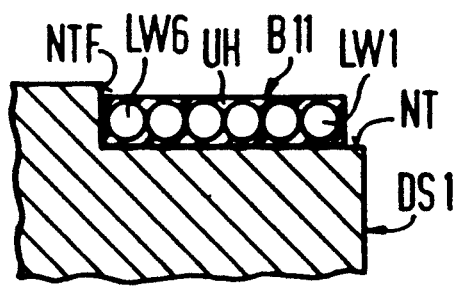
FIG. 12 is a partial cross sectional view taken along the lines XII—XII of FIG. 11.

FIGS. 11 and 12 illustrate an apparatus with which the special type of coating of the individual light waveguides is undertaken in order to obtain the specific band structure required for the cables of the present invention. As shown in detail, for example, a band B11 of FIG. 1 is manufactured wherein it is pointed out that all the other bands, of course, having the same format and structure, can be manufactured in the same way. The individual light waveguides LW1-LW6 of the band B11 are arranged on supply reels V1-V6 and are taken off of the supply reels and supplied to a coating means EU. This coating means EU produces a shared envelope UH (FIG. 12) for the light waveguides. The material FU for the envelope UH can be composed of either a hot-melt adhesive, a plastic material or the like. It is also possible, for example, to join only the contacting lateral regions of each of the individual light waveguides LW1-LW6 to one another, for example with a glue. In any case, however, the envelope UH is to be fashioned so that the bands remain adequately flexible in the finished condition.

After departing the coating means EU, the band B11 will proceed onto a disc DS1 that is provided with a central part or arbor DS11 and a channel NT in its outer region. This channel is at least as broad as the width of the finished band B11 and, likewise, proceeds circularly and symmetrically vis-a-vis an axle AC1 of the disc DS1. Since the disc DS turns around the axis of the axle AC1, a longer path length occurs for the light waveguide LW1 and a shorter path length continuously occurs toward the inside for the other light waveguides, whereby the shortest path length will be assigned to the light waveguide LW6. In other words, a difference in length between waveguides LW1 and LW6 will be directly proportional to the difference in their radius from the axle AC1. The enveloping or coating means EU is arranged approximately tangentially with respect to the channel NT and the light waveguides LW1-LW6 are introduced largely tension-free into the envelope UH formed by the coating or enveloping means EU. A following drying or, respectively, curing means UD, which can be, for example, ultra-violet radiation, will effect a uniform curing of the light waveguides inside the envelope UH, whereby the curing occurs in a curved region so that the finished band, after passing through the curing means UD, will have a uniformly curved shape, or a longitudinal curvature. In detail, the shape is defined by the diameter of the channel side walls NFT of the channel NT and by the width of the band B11, which will be determined by the number of light waveguides contained therein.

Since the band B11 obtained in this way comprises a longitudinal curvature or, respectively, a round structure, the deposit or, respectively, intermediate storage is, likewise, to be expediently undertaken so that this occurs optimally tension-free. To this end, for example, the band can be placed on a disc or on a plate DS2 that, of course, is equipped similar to the disc DS1, as illustrated in Fig. 11. The light waveguide band B11 is found, here, to form a stack BS11 having a corresponding number of layers. However, it is also possible to employ a drum for winding up the band. For example, a central part or arbor DS12 of the disc DS2 would then be the core element of the drum DS2. The light waveguide band B11 would, thus, be wound "on edge" on this drum, as illustrated in FIG. 14.

Figure 13:
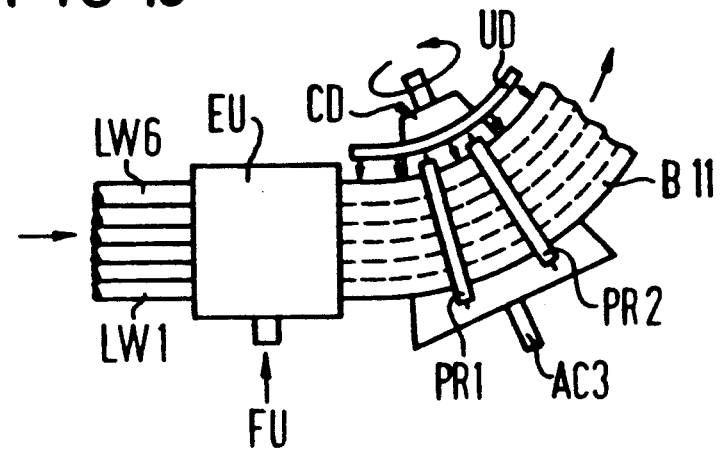
FIG. 13 is a partial plan view of another embodiment for manufacturing bands in accordance with the present invention.
Figure 14:
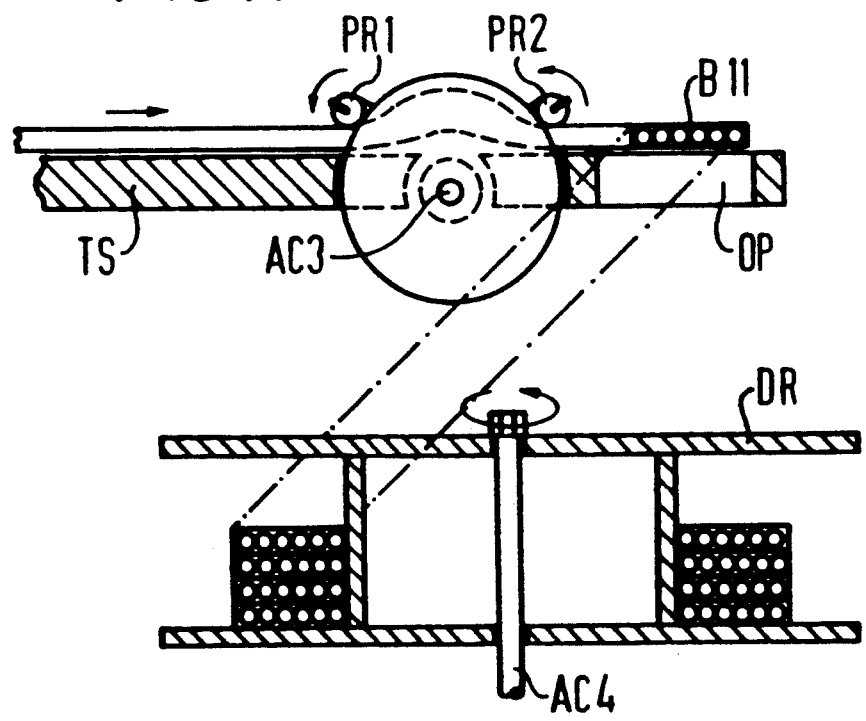
FIG. 14 is a side view of the device of FIG. 13.

In the embodiment of the apparatus illustrated in FIGS. 13 and 14, the longitudinal curvature or curved structure is impressed on the bands. In the arrangement of FIG. 13, the light waveguides LW1-LW6, just as in the embodiment of FIG. 11, are taken down from supply reels and supplied to a coating means EU fashioned just as in FIG.11. With the coating, a light waveguide band B11 provided with an envelope UH at the output of the coating means EU is produced and is then conducted through a curing means UD and, while still soft, is conducted over a conically fashioned drum CD. As may be seen from FIG. 14, the individual light waveguides LW1-LW6, together with the envelope UH are continuously pressed, for example by pressure rollers PR1 and PR2, against the obliquely proceeding generated surface of the conical drum CD. Analogous to FIG. 11, the longer path length for the light waveguide LW1 has a greater radial path than the innermost light waveguide LW6 and, thus, has a greater length than the light waveguide LW6. A drive shaft AC3 for the conical drum CD expediently proceeds in a horizontal plane. By varying the altitude of the drive shaft AC3 obiquely relative to the horizontal plane, the curvature of the band can be varied in a simple way and an easy adaptation to the various stranding radii in the finished cable is, thus, possible. As may be seen from FIG. 14, the drum CD extends into an opening of a table TS and the finished band B11 would then be deposited on the table TS after passing over the drum CD. Since a separate deposit or, respectively, winding onto a drum is more expedient for the immediate storage of the band B11, the table TS has an opening OP, through which the finished, curved band B11, as indicated in dot-dashed lines, is supplied in a downward direction to a drum TR driven via a shaft AC4, whereby a ply-by-ply on-edge winding will occur.

In an analogous way, the take-up drum DS2 in the arrangement of FIG. 11 could also have been arranged under the disc DS1, namely placed somewhat in front of this in terms of space, as a result whereof the part of the band B11 proceeding on a straight line would be kept optimally short. On the other hand, a negative influence on the band in this straight line part is not established, particularly when the band proceeds therein practically without any tensile stresses, for example, can place itself in a desired optimally tension-free position in the transition zone.

Figure 15:
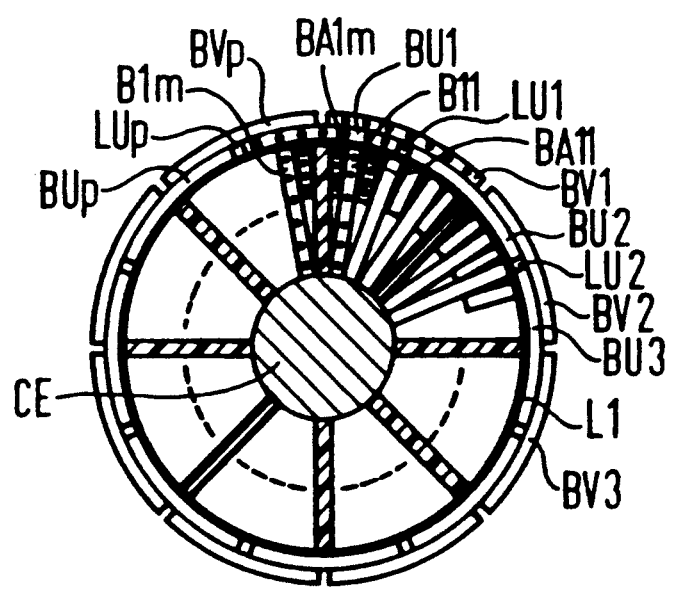
FIG. 15 is a transverse cross sectional view of still a further embodiment of the optical cable of the present invention having both radial extending bands and tangentially arranged bands.

An embodiment of the optical cable in accordance with the present invention is illustrated in FIG. 15, which has a single layer of the radially extending bands, as does the structure of FIG. 2. The reference characters employed in FIG. 2 are used in the embodiment illustrated in FIG. 15, however, it is also possible to use any of the other structures, such as the cable of FIG. 1 or FIGS. 3–10, for the core region of the cable. After at least one layer, such as the layer containing the radially extending bands B11–B1m and also the smaller bands BA11-BA1m, are inserted therebetween at least one layer of bands BU1-BUp, essentially extending in a circumferential direction, are applied. These bands are applied without mutual overlap, since it is expedient to provide a small gap, such as LU-LUp between the bands for compensation processes or the like. Especially high packing densities can be achieved with such a mixed structure and simple adaptation to corresponding fabrication processes is also possible. Potential layers of additional bands lying farther toward the outside can be applied in a radial direction as a continuation, similar to the outer layers B21-B21n of FIG. 1, or can be placed on the band layers BU1-BUp, which proceed in the circumferential direction. However, it is also possible to strand a second layer BV1-BVp that also proceed in a circumferential direction onto the first layer of bands BU1-BUp. This second layer of bands BV1-BVp are proceeding in a circumferential direction, and, preferably, with the direction of the lay being in an opposite direction to the direction of lay for the bands BU1-BUp.

Although various minor modifications may be suggested by those versed in the art, it should be understood that I wish to embody within the scope of the patent granted hereon all such modifications as reasonably and properly come within the scope of my contribution to the art.

I claim:

1. In an optical cable comprising a cable core element and a plurality of bands, each band containing a plurality of individual light waveguides within a shared envelope, which envelope guarantees a cohesion of the individual light waveguides and each band having a long side, said bands being stranded on the core element with the long side of each band extending in a radial direction, each band having a uniformly curved shape around an innermost edge, which curved shape is applied during production of the band, and a light waveguide of each band lying on the radial outermost portion of the band having a longer length than the optical waveguides disposed radially inward therefrom due to said uniform curved shape.

2. An optical cable according to claim 1, wherein the length of the light waveguides increases from inside to outside to exactly the same extent by which the path occupied by the light waveguide in the finished cable is longer than in the case of the light waveguide respectively lying further toward the inside.

3. An optical cable according to claim 1, wherein the bands of the light waveguides are arranged with inner edges abuttingly intermediately against the core element and adjacent bands are separated by a gap at a point radially outward from the core element.

4. An optical cable according to claim 3, wherein additional light waveguide bands, whose radial extent is less than that of the first-mentioned neighboring bands, are arranged in the gap between the two first-mentioned neighboring bands.

5. An optical cable according to claim 4, wherein the additional bands are arranged with their inner edge being viewed radially abutting a broader neighboring first-mentioned bands.

6. An optical cable according to claim 3, wherein additional bands having a wedge shape are arranged in each of the gaps.

7. An optical cable according to claim 6, wherein the shape of the wedge-shaped bands is selected so that a small inner space will remain to provide a substantially closed layer of bands.

8. An optical cable according to claim 1, wherein each of the bands is fashioned with a thickened radial outer region containing more waveguides than the inner radial portion of the band.

9. An optical cable according to claim 8, wherein the bands are fashioned with a folded-over outer region.

10. An optical cable according to claim 8, wherein the bands comprise a wedge-shaped structure which is fashioned with its broadest portion in the outer radial region and the narrow portion in the inner radial region.

11. An optical cable according to claim 10, wherein the wedge-shaped band has fewer light waveguides at the inner radial region and more light waveguides at the outer radial region.

12. An optical cable according to claim 1, which includes the core element having a layer having outwardly opening chambers for receiving the bands.

13. An optical cable according to claim 1, wherein the core element includes a layer having inwardly opening chambers for receiving the bands.

14. An optical cable according to claim 1, wherein the bands have an SZ-stranding and are arranged with an angular range of ±20° with reference to an exact radial direction.

15. An optical cable according to claim 1, wherein the bands are stranded with a long lay stranding on the core element and have an angular range of ±70° relative to an exact radial direction.

16. An optical cable according to claim 1, wherein the plurality of optical waveguides is in a range of 4 to 12 waveguides.

17. An optical cable according to claim 1, wherein the cable core element includes at least one tensile element.

18. An optical cable according to claim 17, wherein the tensile element is arranged in the center of the cable core element.

19. An optical cable according to claim 1, which includes spacers extending in a radial direction being provided as support elements.

20. An optical cable according to claim 1, wherein at least one layer of bands extending in a circumferential direction are additionally provided on a layer of the radially extending bands.

21. A method for manufacturing bands for an optical cable having bands stranded on edge on a central core with a major width of the band extending in a radial direction, said method comprising the steps of providing a plurality of individual light waveguides lying in a substantial plane to a coating means, applying a coating material to the waveguides while in the coating means to form an envelope to guarantee the cohesion of the individual light waveguides, acting on the waveguides as they leave the coating means so that the waveguide, on the outermost edge of the band, will have a greater length than the waveguide on the innermost edge and the band will have uniform curved shape around the innermost edge.

22. A method according to claim 21, wherein after the step of acting on the light waveguides, the band of light waveguides is annularly deposited so that the light waveguides remain essentially free of tensile forces on the inside of the band.

23. The method according to claim 22, wherein the step of depositing comprises depositing the band on a rotating plate.

24. The method according to claim 22, wherein the step of depositing includes winding the band edgewise on a drum with the light waveguide on the inner edge of the band likewise in contact with a surface of the drum.

25. A method according to claim 21, which further includes edge stranding the bands on a core element with the bands extending in a radial direction from the axis of the core to obtain an optimally tight packing of the waveguides.

26. A method according to claim 25, wherein the step of stranding the bands on the core element forms a first layer of radially proceeding bands and includes applying a second layer of radially extending bands on the first layer.

27. A method according to claim 25, wherein the step of providing the central element provides a central element having radially outwardly opening chambers, and said step of stranding the bands radially applies the bands in said chambers with the bands extending essentially in a radial direction therein.

28. A method according to claim 25, wherein the step of providing the central element provides a central element having radially inwardly opening chambers and said step of stranding the bands in a radial direction provides the bands in said chambers.

* * * * *